United States Patent
Jang

(10) Patent No.: US 7,193,199 B2
(45) Date of Patent: Mar. 20, 2007

(54) SOLID-STATE IMAGE-SENSING DEVICE THAT COMPENSATES FOR BRIGHTNESS AT EDGES OF A DISPLAY AREA AND A DRIVING METHOD THEREOF

(75) Inventor: Hyun-Jeong Jang, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 280 days.

(21) Appl. No.: 11/007,707

(22) Filed: Dec. 8, 2004

(65) Prior Publication Data
US 2005/0173616 A1 Aug. 11, 2005

(30) Foreign Application Priority Data
Feb. 9, 2004 (KR) .................... 10-2004-0008255

(51) Int. Cl.
H01L 27/00 (2006.01)
H04N 5/335 (2006.01)
(52) U.S. Cl. .................................. 250/208.1; 348/308
(58) Field of Classification Search ............. 250/208.1; 348/297, 308
See application file for complete search history.

(56) References Cited

U.S. PATENT DOCUMENTS 6,115,065 A * 9/2000 Yadid-Pecht et al. ....... 348/308
7,119,317 B2 * 10/2006 Ando et al. ............. 250/208.1

FOREIGN PATENT DOCUMENTS

| JP | 11-266002 | 9/1999 |
| KR | 99-37494 | 5/1999 |
| KR | 01-61530 | 7/2001 |
| KR | 03-47730 | 6/2003 |

\* cited by examiner

Primary Examiner—Stephone B. Allen
(74) Attorney, Agent, or Firm—F. Chau & Associates, LLC

(57) ABSTRACT

A solid-state image-sensing device that compensates for brightness at edges of a screen and a method of driving the device are provided. The solid-state image-sensing device comprises: an active pixel sensor (APS) array including pixels disposed in a two-dimensional matrix, each pixel for outputting a photoelectrically converted image signal generated by a photodiode in response to one of a plurality of transmission control signals transmitted to a selected row of the APS array, and for generating and outputting a reset signal in response to a reset control signal; a row driver for selecting a row of the APS array by generating row selection signals and for generating the reset control signal; an integration time control driver for generating the transmission control signals for setting non-uniform integration times of the photodiodes in each pixel; and an analog-digital converter for converting an analog signal corresponding to a difference between the image signal and the reset signal into a digital signal.

17 Claims, 6 Drawing Sheets

SOLID-STATE IMAGE-SENSING DEVICE THAT COMPENSATES FOR BRIGHTNESS AT EDGES OF A DISPLAY AREA AND A DRIVING METHOD THEREOF

CROSS-REFERENCE TO RELATED APPLICATION

This application claims priority to Korean Patent Application No. 2004-8255, filed on Feb. 9, 2004, in the Korean Intellectual Property Office, the disclosure of which is incorporated herein in its entirety by reference.

FIELD OF THE INVENTION

The present invention relates to a solid-state image-sensing device, and more particularly, to a complementary metal-oxide semiconductor (CMOS) image sensor (CIS)-type solid-state image-sensing device.

DESCRIPTION OF THE RELATED ART

A complementary metal-oxide semiconductor (CMOS) image sensor (CIS)-type solid-sate image-sensing device can be mounted in, for example, a mobile phone camera or digital still camera, and senses visible images, converts the images into electrical signals, and transfers the electrical signals to a digital signal processor. The digital signal processor processes color image data (e.g., red, green, and blue data) output from the solid-state image-sensing device, and drives a display device such as a liquid crystal display (LCD).

FIG. 1 is a block diagram of a general CIS-type solid-state image-sensing device 100. Referring to FIG. 1, the general CIS-type solid-state image-sensing device 100 includes an active pixel sensor (APS) array 110, a row driver 120, and an analog-digital converter 130. The row driver 120 receives a control signal from a row decoder (not shown), and the analog-digital converter 130 receives a control signal from a column decoder (not shown). The general CIS-type solid-state image-sensing device 100 further includes a controller (not shown) that generates address signals for outputting general timing control signals, selecting corresponding pixels, and outputting sensed image signals. Usually, when the general CIS-type solid-state image-sensing device 100 is a color solid-state image-sensing device, a color filter that receives colored light is installed on top of each pixel of the APS array 110, and at least three types of color filters are used to produce color signals. A common color filter array employs a Bayer pattern in which one row containing two colors red (R) and green (G) and a row containing two colors G and blue (B) are alternated. Here, G, which is closely related to a brightness signal, is disposed on all rows, and the R and B colors are alternately disposed to attain a high brightness resolution. To attain a high brightness resolution in, for example, a digital still camera, a CIS-type solid-state image-sensing device including more than one million pixels is used.

In the CIS-type solid-state image-sensing device 100 with this pixel structure, the APS array 110 generates image signals by sensing light with a photodiode, which converts the sensed light into electrical signals. The image signal output from the APS array 110 is an analog signal representing the three colors, R, G, and B. The analog-digital converter 130 converts the received analog image signal output from the APS array 110 into a digital signal.

In the general CIS-type solid-state image-sensing device 100, a correlated double sampling (CDS) method is used when the image signal produced by the photodiode is converted into the digital signal by the analog-digital converter 130. Such a driving method is described in, for example, U.S. Pat. Nos. 5,982,318 and 6,067,113. The analog-digital conversion according to the CDS method is divided into two operations: receiving a reset signal from the APS array 110, and converting the image signal sensed by the photodiode into the digital signal. When the photodiode first senses light during a predetermined time interval, the APS array 110 outputs the reset signal to the analog-digital converter 130 before the photodiode outputs the sensed image signal to the analog-digital converter 130. After resetting in response to the reset signal, the analog-digital converter 130 converts the image signal into the digital signal and outputs the digital signal. The digital signal is then output to a digital signal processor and is interpolated. The digital signal processor generates driving signals appropriate for resolutions that correspond to a display device such as an LCD.

FIG. 2 is a graph illustrating a relationship between a horizontal location X of the APS array 110 and integration time. Referring to FIG. 2, the integration time is typically steady for the horizontal location of the APS array 110. FIG. 3 is a graph illustrating a relationship between a horizontal location X of the APS array 110 and pixel sensitivity. Referring to FIG. 3, edges of the APS array 110 have less sensitivity than a center of the APS array 110. Thus, if the integration times of all the photodiodes are the same, as illustrated in FIG. 2, the photodiodes forming the pixels receive more light and accumulate more charges at the center of the APS array 110, and the photodiodes forming the pixels receive less light and accumulate fewer charges toward the edges of the APS array 110. When displaying an image using the image signals output from the conventional CIS-type solid-state image-sensing device 100, the center of a screen is brighter than the edges of the screen. This is not a serious problem for a display using common intermediate format (CIF) with a resolution of 352×288, but is for a display using a super extended graphics adaptor (SXGA) with a resolution of 1280×1024, and becomes more serious with increases in resolution.

Other techniques for structuring pixels of the APS array 110 and other processes for fabricating the APS array 110 do not completely remove the difference in the brightness between the center and the edges of the APS array 110. Therefore, some APS arrays have been designed to include a programmable gain amplifier (PGA) in their analog-digital converters and methods that compensate for the output signals of the analog-digital converter in an image digital signal processor (ISP) have been used. However, even when employing these techniques, quantum noise increases during signal processing, thus leading to other problems such as a blinking screen.

SUMMARY OF THE INVENTION

The present invention provides a complementary metal-oxide semiconductor (CMOS) image sensor (CIS)-type solid-state image-sensing device that outputs image signals from the center and edges of an active pixel sensor (APS) array at a uniform level without a low signal-to-noise ratio (SNR) or decreased sensitivity at the edges of the APS array while producing a uniformly bright image on a screen without increasing quantum noise. The present invention also provides a method of driving a CIS-type solid-state image-sensing device that can output image signals from the center and edges of an APS array at a uniform level such that a uniformly bright image is displayed on a screen.

According to an aspect of the present invention, there is provided a solid-state image-sensing device including an APS array, a row driver, an integration time control driver, and an analog-digital converter. The APS array includes pixels disposed in a two-dimensional matrix. Each of the pixels includes a photodiode that outputs a photoelectrically converted image signal in response to a transmission control signal at a selected row, and the pixel generates and outputs a reset signal in response to a reset control signal. The row driver selects rows of the APS array by generating row selection signals that are sequentially activated, and generates the reset control signal. The integration time control driver generates the transmission control signal that sets non-uniform integration times of the photodiodes. The analog-digital converter converts an analog signal corresponding to a difference between the image signal and the reset signal into a digital signal.

The APS array is divided into a plurality of groups, each including a plurality of rows, and the transmission control signals set non-uniform integration times for photodiodes of each of the groups and each of the rows of one of the groups, and set the same integration times for photodiodes disposed in the same column within each of the groups. The transmission control signal can set the integration times of side photodiodes of each of the rows of the groups to be longer than the integration times of photodiodes closer to the center of the APS array. Also, the transmission control signal can symmetrically set integration times of photodiodes disposed symmetrically about a central row of pixels of the APS array.

The integration time control driver can include a counter, a register, and a transmission control signal generating logic. The counter generates row number information indicating a row number of the APS array by counting pulses of a system clock signal synchronized with a vertical synchronous signal. The register generates curvature information of relevant rows based on the row number information. The transmission control signal generating logic generates the transmission control signal based on the curvature information.

According to another aspect of the present invention, there is provided a method of driving a solid-state image-sensing device, the method including selecting rows of an APS array by generating row selection signals that are sequentially activated; generating a reset control signal; generating a transmission control signal for setting integration times of photodiodes of the APS array including pixels disposed in a two-dimensional array to be non-uniform; outputting photoelectrically converted image signals generated by the photodiode in response to the transmission control signals, and generating and outputting a reset signal in response to the rest control signal; and converting an analog signal corresponding to a difference between the image signal and the reset signal into a digital signal, and outputting the digital signal.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
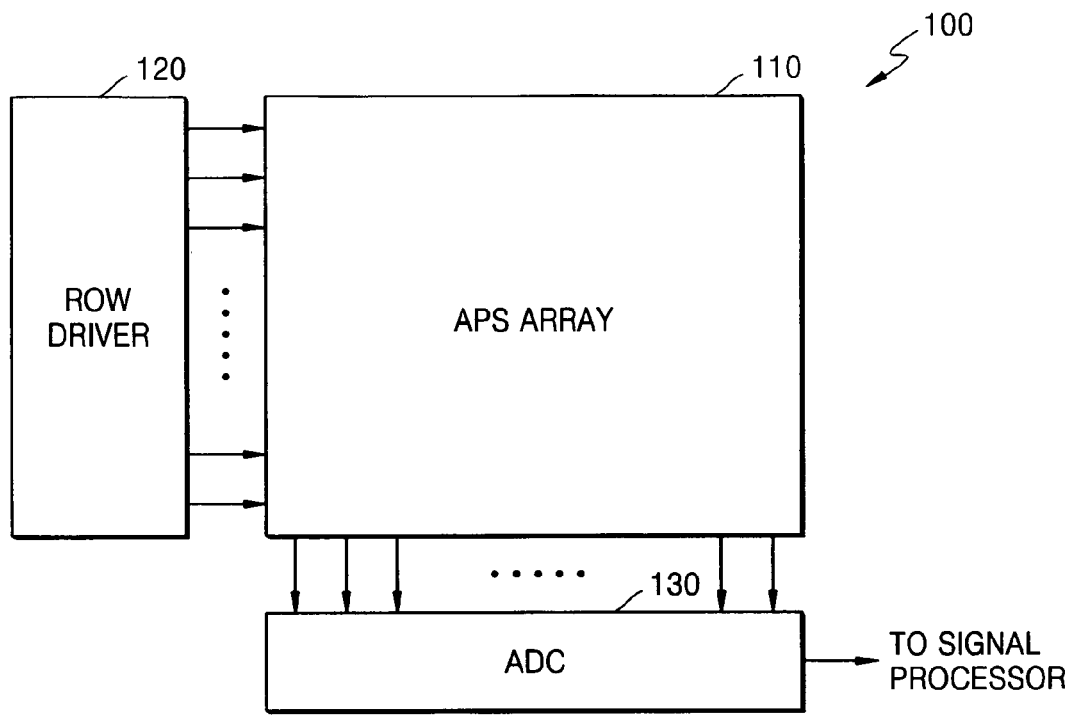
FIG. 1 is a block diagram of a general complementary metal-oxide semiconductor (CMOS) image sensor (CIS)-type solid-state image-sensing device.
Figure 2:
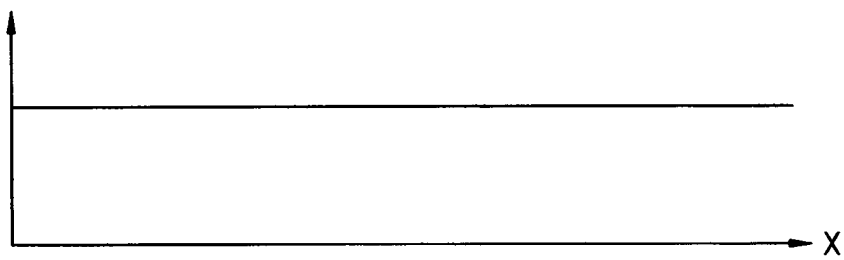
FIG. 2 is a graph illustrating a relationship between a horizontal location in an active pixel sensor (APS) array of FIG. 1 and integration time.
Figure 3:
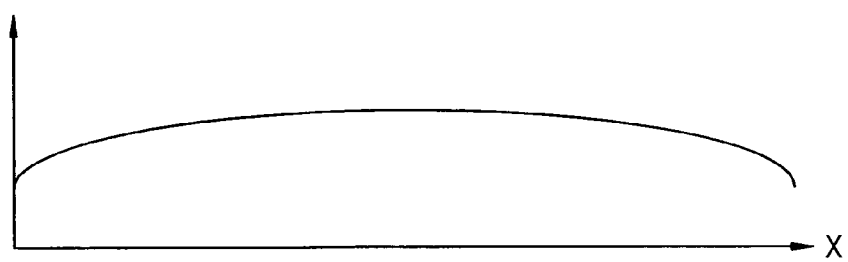
FIG. 3 is a graph illustrating a relationship between the horizontal location in the APS array of FIG. 1 and pixel sensitivity.
Figure 4:
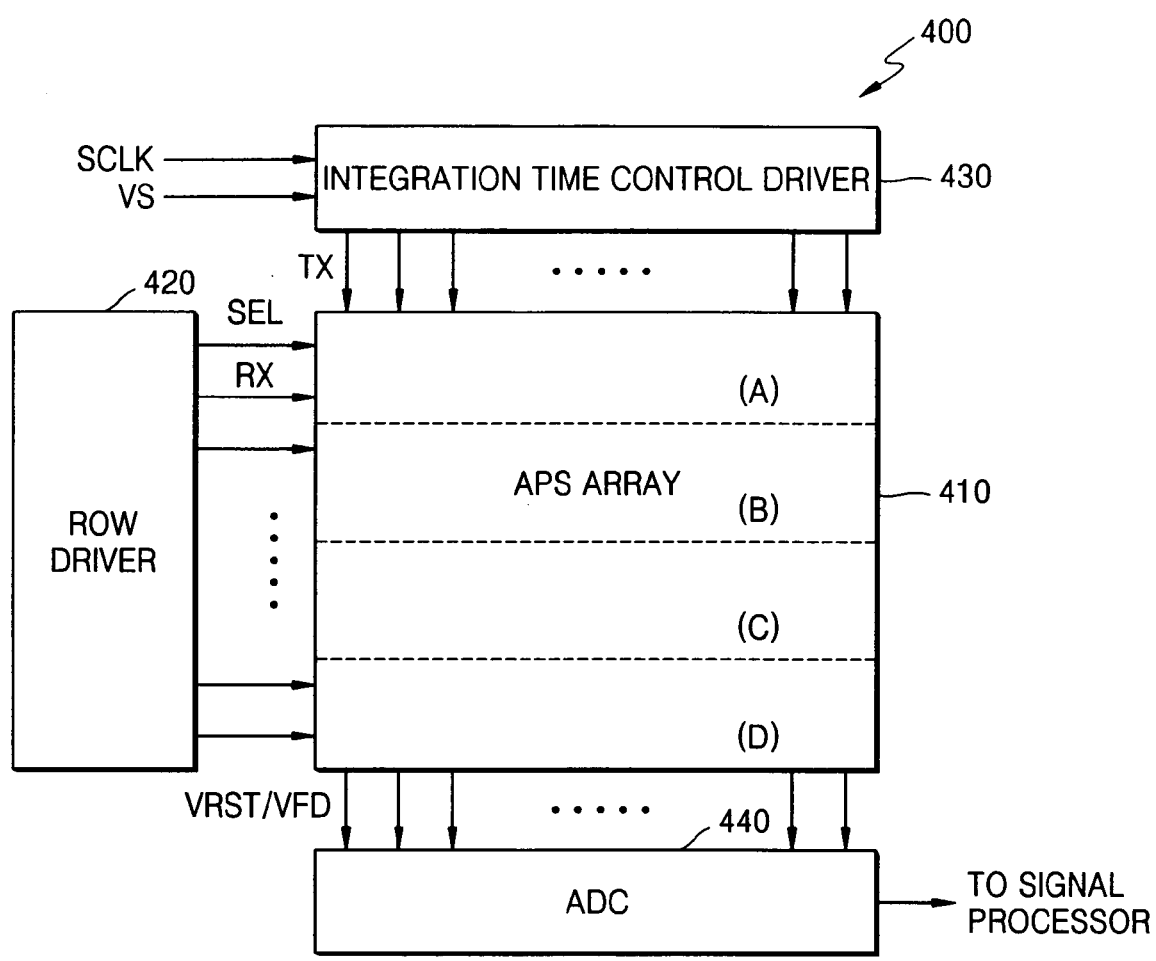
FIG. 4 is a block diagram of a CIS-type solid-state image-sensing device according to an exemplary embodiment of the present invention.

FIG. 4 is a block diagram of a complementary metal-oxide semiconductor (CMOS) image sensor (CIS)-type solid-state image-sensing device 400 according to an exemplary embodiment of the present invention. Referring to FIG. 4, the CIS-type solid-state image-sensing device 400 includes an active pixel sensor (APS) array 410, a row driver 420, an integration time control driver 430, and an analog-digital converter 440.

Figure 5:
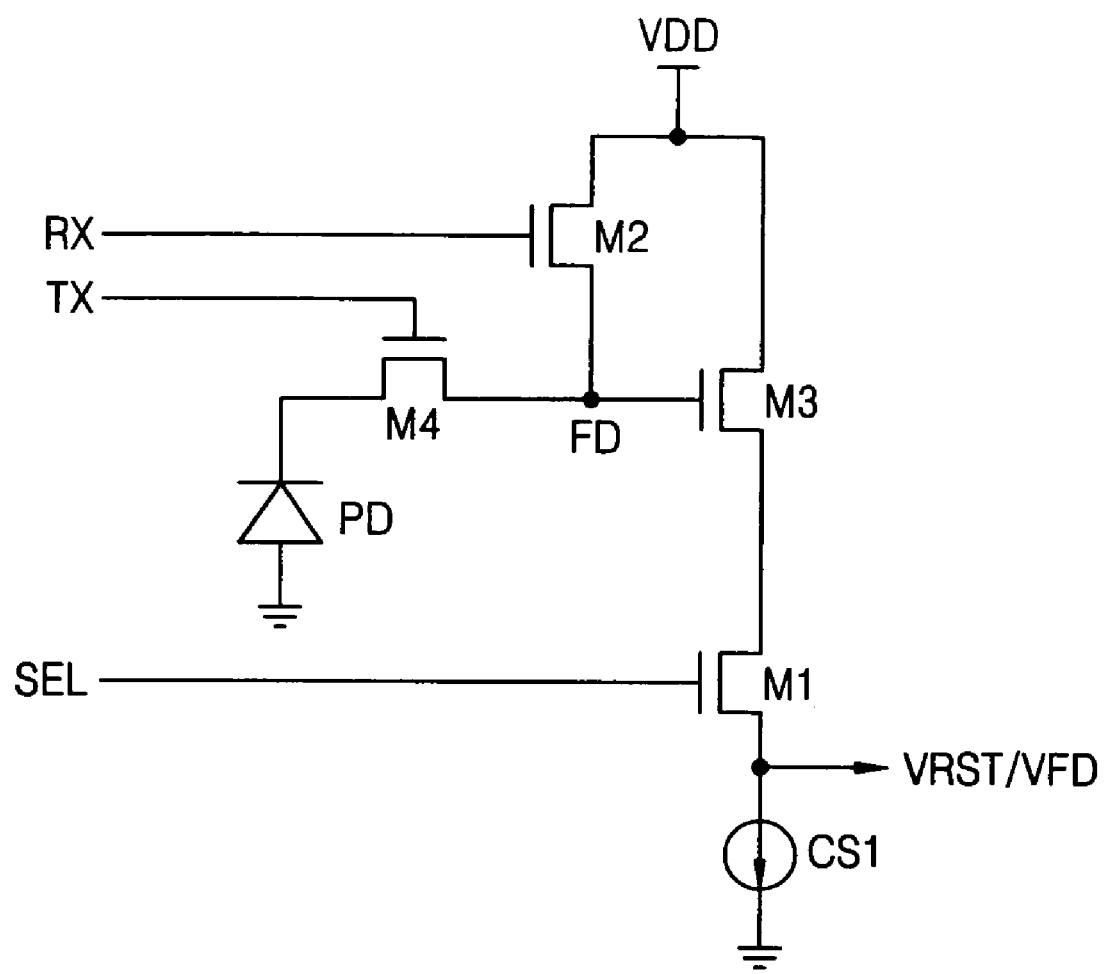
FIG. 5 is a circuit diagram of a pixel included in an APS array of the CIS-type solid-state image-sensing device shown in FIG. 4.

The APS array 410 is a two-dimensional array of pixels. The pixels of the APS array 410 are each configured in a circuit as illustrated in FIG. 5. Referring to FIG. 5, a pixel of the APS array 410 outputs a photoelectrically converted image signal VFD generated by a photo diode PD in response to a transmission control signal TX in a row selected by a row selection signal SEL, and then generates and outputs a reset signal VRST in response to a reset signal RX.

As shown in FIG. 5, each pixel includes four metal-oxide semiconductor field-effect transistors (MOSFET) M1 through M4, one photodiode PD, and a current source CS1 (shown, for example, with a bias circuit). A power voltage VDD at an FD node is output via a source terminal of the MOSFET M3 that acts as a source follower when the reset control signal RX is activated to a logic high state when the row selection signal SEL is activated to a logic high state. The voltage of the FD node output from the source terminal of the MOSFET M3 is output to the analog-digital converter 440 as the reset signal VRST via a source terminal of the MOSFET M1. A voltage lower than the voltage at the FD node can be used as the reset signal VRST due to the effect of, for example, a clock feed-through, when the reset control signal RX falls to a logic low state. On the other hand, the transmission control signal TX is activated to a logic high state when the reset control signal RX is in a logic low state, and the photoelectrically converted image signal VFD generated by the photo diode PD is output to the analog-digital converter 440 via the source terminal of the MOSFET M1.

Referring back to FIG. 4, the row driver 420 generates the row selection signals SEL, which are sequentially activated, selects each row of the APS array 410, and generates the reset control signal RX. The integration time control driver 430 generates the transmission control signal TX, which sets integration times of the photodiodes PD of the pixels of the APS array 110 to be non-uniform. In other words, the integration time control driver 430 generates a transmission control signal TX that sets integration times of side photodiodes PD to be longer than the integration times of central photodiodes PD of the APS array 410 such that the brightness of a display screen is uniform. That is, the brightness of the display screen is made uniform by setting the integration time of the photodiodes PD disposed at the edges of the APS array 410 to be longer than the integration time of the photodiodes PD disposed at the center of the APS array 410. Thus, the brightness of the sides, i.e., location that corresponds to sides of the APS array 410, of the display screen is improved.

As illustrated in FIG. 4, the APS array 410 is divided into a plurality of groups A, B, C, and D, which are controlled such that the photodiodes PD have different integration times. It is to be understood by one of ordinary skill in the art that more groups can exist, and the number of groups can be an even or odd number. The integration times for all rows within one group are equal, and the integration times are different for all columns within one group. The integration time control driver 430 will be explained in more detail with reference to FIGS. 6 through 11.

As further shown in FIG. 4, the analog-digital converter 440 converts an analog signal that corresponds to a difference between the image signal VFD and the reset signal VRST into a digital signal and outputs the digital signal according to a correlated double sampling (CDS) method. The converted digital signal is output to a digital signal processor and is interpolated. The digital signal processor generates driving signals appropriate for resolutions of display devices such as a liquid crystal display (LCD) and drives the display devices.

Figure 6:
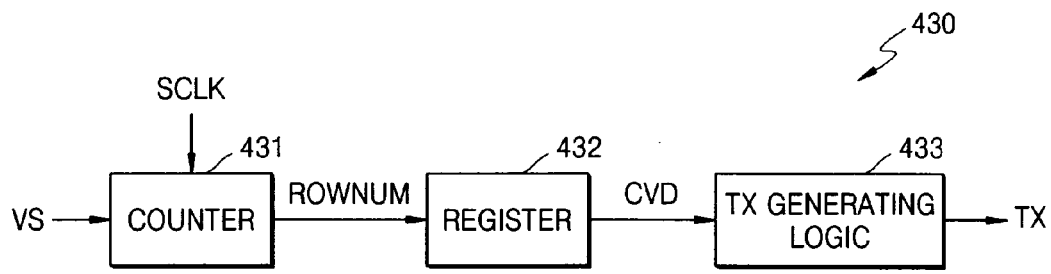
FIG. 6 is a block diagram of an integration time control driver of the CIS-type solid-state image-sensing device shown in FIG. 4.

FIG. 6 is a block diagram of the integration time control driver 430 of FIG. 4. Referring to FIG. 6, the integration time control driver 430 includes a counter 431, a register 432, and a transmission control signal generating logic 433.

The counter 431 counts pulses of a system clock signal SCLK synchronized with a vertical synchronous signal VS, and generates row number information ROWNUM that indicates a row number of the APS array 410. The vertical synchronous signal VS indicates one screen, i.e., one frame. The row selection signal SEL is activated every time a row is selected to transmit the reset signal VRST and the image signal VFD of the row. The system clock signal SCLK is also used when generating the row selection signals SEL, and is synchronized with the row selection signals SEL.

Figure 7:
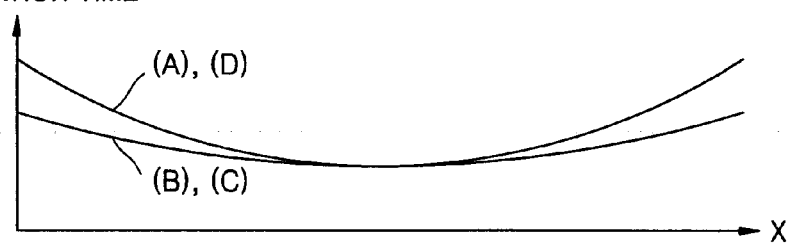
FIG. 7 is a graph illustrating a relationship between a horizontal location in an APS array and integration time in the CIS-type solid-state image-sensing device of FIG. 4.

The register 432 generates curvature data CVD for corresponding rows using the row number information ROWNUM. For example, when the APS array 410 is divided into four groups A, B, C, and D as shown in FIG. 4, the curvature data CVD indicates the integration time of the horizontal location X of the APS array 410 for each group, as shown in FIG. 7. Referring to FIG. 7, X indicates the horizontal location from a left or right edge of the APS array 410. In other words, in FIG. 7, groups A and D of FIG. 4 have longer integration times at the left and right sides of the APS array 410 as compared to groups B and C. This is to compensate for the relative darkness at the left and right edges of the display screen, which correspond to the sides of the APS array 410.

Figure 8:
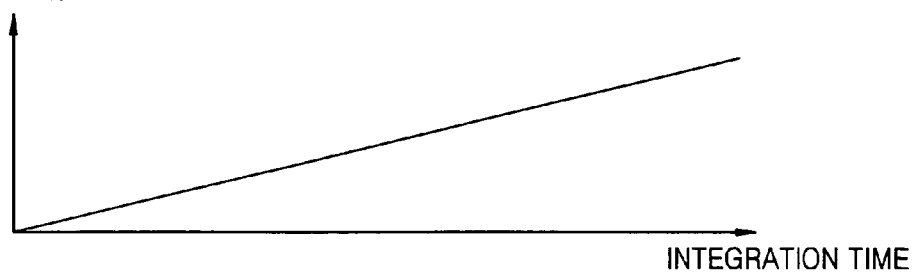
FIG. 8 is a graph illustrating a relationship between integration time of the APS array and a sensitivity/image signal in the CIS-type solid-state image-sensing device of FIG. 4.

The curvature data CVD can be used because a relationship between the integration time and photodiode sensitivity and the image signal VFD is linear as illustrated in FIG. 8. In other words, as the integration time increases, the sensitivity of the photodiode and the image signal VFD also increases. Thus, increasing the integration time of the photodiode has the same effect as increasing output power by increasing a gain in a programmable gain amplifier (PGA).

Figure 9:
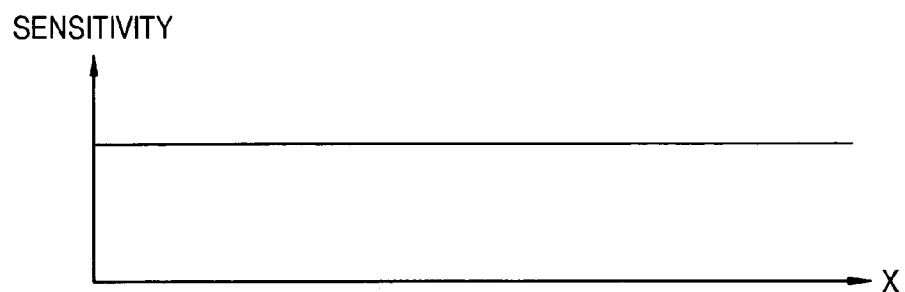
FIG. 9 is a graph illustrating a relationship between a horizontal location in the APS array and sensitivity in the CIS-type solid-state image-sensing device of FIG. 4.

Due to the above-mentioned relationship, the transmission control signal generating logic 433 generates different transmission control signals TX for the groups A, B, C, and D using the curvature information CVD. In other words, the transmission control signals TX set all rows within one group to have the same integration time and all columns within one group to have different integration times. The transmission control signals TX are set differently for the respective groups A, B, C, and D each including a plurality of rows of the APS array 410. A relationship between the horizontal location X in the APS array 410 and sensitivity is uniform, as shown in FIG. 9, when the transmission control signal TX is generated. Thus, the brightness of the display screen including portions corresponding to the center and edges of the APS array 410 is uniform.

The operation of the integration time control driver 430 of FIG. 4 will now be described in more detail.

Figure 10:
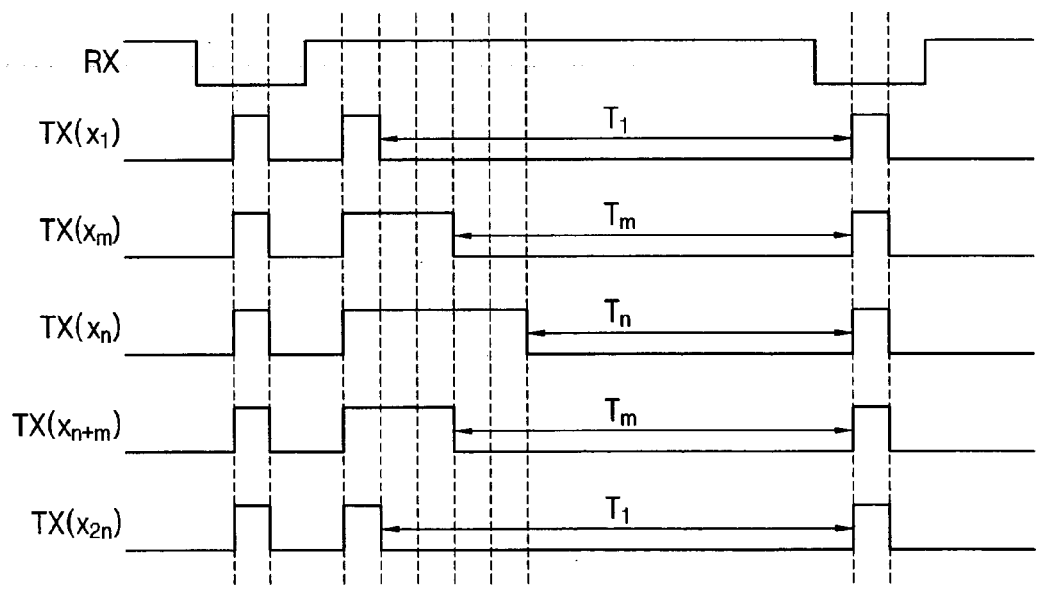
FIG. 10 is a timing diagram for explaining the operation of an integration time control driver of the CIS-type solid-state image-sensing device shown in FIG. 4.
Figure 11:
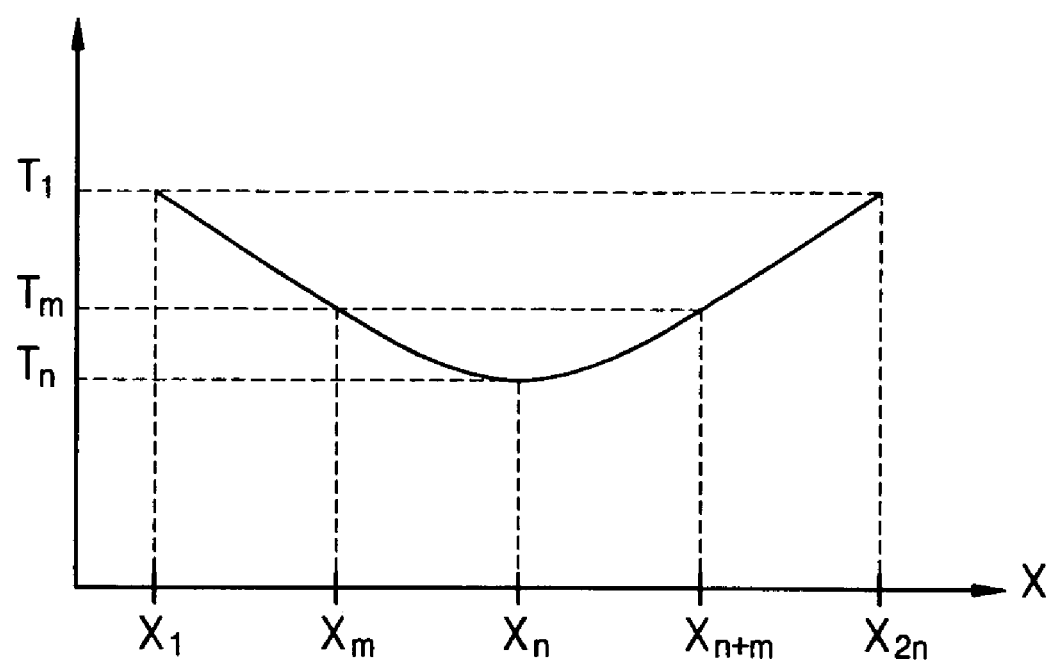
FIG. 11 is a graph illustrating a relationship between a horizontal location in the APS array and integration time according to FIG. 10.

FIG. 10 is a timing diagram for explaining the operation of the integration time control driver 430 of FIG. 4. Referring to FIG. 10, the transmission control signal generating logic 433 of the integration time control driver 430 generates and outputs different transmission control signals TX to respective rows of the groups A, B, C, and D. In other words, the transmission control signal generating logic 433 of the integration time control driver 430 generates the transmission control signals TX that set the integration times of the photodiodes PD of respective rows of corresponding groups to be longer for the photodiodes PD closer to the edges of the APS array 410. For example, the transmission control signal TX can be generated as illustrated in FIG. 10 for a group that has the curvature information CVD as illustrated in FIG. 11. A pixel at a location $x_1$ receives a transmission signal $TX(x_1)$, and a corresponding photodiode PD integrates light for a time $T_1$ and then photoelectrically converts the integrated light. Likewise, a pixel at a location $X_n$ receives a transmission signal $TX(x_n)$, and a corresponding photodiode PD integrates light for time $T_n$ and then photoelectrically converts the integrated light. When the APS array 410 is divided into an even number of groups A, B, C, and D as illustrated in FIG. 4, the light integration time for the photodiodes PD is symmetrical about a central line between the groups B and C because the curvature information CVD is the same about the central line.

When the APS array 410 is divided into an odd number of groups, the light integration time for the photodiodes PD is symmetrical about the central line. In other words, when the APS array 410 is divided into an odd number of groups, integration times of the photodiodes PD of each of the rows of the central group are non-uniform while the integration times of the photodiodes PD disposed in the same column within the central group are set to be the same. Therefore, the integration times of the photodiodes PD disposed symmetrically about the central line are the same because the integration times of all the photodiodes PD disposed on the same column are the same in the center group. In addition, the curvature information CVD is the same for groups that are symmetrical about a central line, and accordingly, the integration times of the photodiodes PD disposed symmetrically about the central line are also the same in groups other than the central group.

As described above, the photodiodes PD of the CIS-type solid-state image-sensing device 400 according to an exemplary embodiment of the present invention obtain uniform sensitivity by applying a short integration time to central pixels and a longer integration time to pixels located toward edges of the APS array 410, thus generating the uniform image signals VFD. Therefore, a relative difference in the level of the image signals VFD output from the center and edges of the APS array 410 is eliminated, and a signal-to-noise ratio (SNR) is decreased and sensitivity at the edges of the APS array 410 is improved. In addition, the CIS-type solid-state image-sensing device can output image signals from the center and edges of the APS array 410 with a uniform level but without any quantum noise. Thus, an entire display screen is uniformly bright.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A solid-state image-sensing device comprising:
   an active pixel sensor (APS) array including pixels disposed in a two-dimensional matrix, each pixel for outputting a photoelectrically converted image signal generated by a photodiode in response to one of a plurality of transmission control signals transmitted to a selected row of the APS array, and for generating and outputting a reset signal in response to a reset control signal;
   a row driver for selecting a row of the APS array by generating row selection signals and for generating the reset control signal;
   an integration time control driver for generating the transmission control signals for setting non-uniform integration times of the photodiodes in each pixel; and
   an analog-digital converter for converting an analog signal corresponding to a difference between the image signal and the reset signal into a digital signal.

2. The device of claim 1, wherein the APS array is divided into a plurality of groups, each group including a plurality of rows, wherein the transmission control signals set non-uniform integration times for photodiodes of each of the groups and each of the rows of one of the groups and set same integration times for photodiodes disposed in a same column within each of the groups.

3. The device of claim 2, wherein the integration time control driver generates the transmission control signals for setting integration times of side photodiodes of each of the rows of the groups to be longer than integration times of photodiodes closer to the center of the APS array.

4. The device of claim 2, wherein the integration time control driver generates the transmission control signals for symmetrically setting integration times of photodiodes disposed symmetrically about a central line of the APS array.

5. The device of claim 1, wherein the integration time control driver comprises:

a counter for generating row number information indicating a row number of the APS array by counting pulses of a system clock signal synchronized with a vertical synchronous signal;
   a register for generating curvature information for rows based on the row number information; and
   a transmission control signal generator for generating the transmission control signals based on the curvature information.

6. The device of claim 5, wherein, if the APS array is divided into an even number of groups, the curvature information indicates that the integration times of photodiodes disposed symmetrically about a central line are equal.

7. The device of claim 5, wherein, if the APS array is divided into an odd number of groups, the curvature information indicates that the integration times of photodiodes disposed symmetrically about a central line and not included in a central group are equal.

8. The device of claim 1, wherein each of the pixels comprises:
   a photodiode for generating the image signal;
   a first transistor for receiving one of the row selection signals and a power voltage and outputting the reset signal and image signal;
   a second transistor for receiving the reset control signal and the power voltage;
   a third transistor for receiving the power voltage and outputting the power voltage to the first transistor; and
   a fourth transistor for receiving one of the transmission control signals and transmitting the image signal.

9. The device of claim 1, further comprising:
   a digital signal processor for receiving the digital signal from the analog-digital converter and generating a signal for driving a display device.

10. A method of driving a solid-state image-sensing device, the method comprising:
    selecting rows of an active pixel sensor (APS) array by generating row selection signals;
    generating a reset control signal;
    generating transmission control signals for setting integration times of a plurality of photodiodes of the APS array to be non-uniform;
    outputting photoelectrically converted image signals generated by the photodiodes in response to the transmission control signals, and generating and outputting reset signals in response to the reset control signal; and
    converting analog signals corresponding to a difference between the image signals and the reset signals into digital signals, and outputting the digital signals.

11. The method of claim 10, wherein the transmission control signals set non-uniform integration times for photodiodes of each of a plurality of groups into which the APS array is divided and each of the rows of one of the groups, and set same integration times for photodiodes disposed in a same column within each of the groups.

12. The method of claim 11, wherein the transmission control signals set the integration times of side photodiodes of each of the rows of the groups to be longer than integration times of photodiodes closer to the center of the APS array.

13. The method of claim 11, wherein the transmission control signals symmetrically set the integration times of photodiodes disposed symmetrically about a central line of the APS array.

14. The method of claim 10, wherein generating the transmission control signal comprises:
- generating row number information indicating a row number of the APS array by counting pulses of a system clock signal synchronized with a vertical synchronous signal;
- generating curvature information for rows of the APS array based on the row number information; and
- generating the transmission control signal based on the curvature information.

15. The method of claim 14, wherein, if the APS array is divided into an even number of groups, the curvature information indicates that the integration times of photodiodes disposed symmetrically about a central line are equal.

16. The method of claim 14, wherein, if the APS array is divided into an odd number of groups, the curvature information indicates that the integration times of photodiodes disposed symmetrically about a central line and not included in a central group are equal.

17. The method of claim 10, further comprising:
- generating signals for driving a display device in response to the digital signals.

* * * * *